United States Patent [19]

Dumont

[11] Patent Number: 5,108,498

[45] Date of Patent: Apr. 28, 1992

[54] METHOD OF CLEANING DEBRIS

[75] Inventor: Eugen Dumont, Frankfurt am Main, Fed. Rep. of Germany

[73] Assignee: B.C.C. Becker Consultants (Canada) Inc., Concord, Canada

[21] Appl. No.: 513,279

[22] Filed: Apr. 18, 1990

[30] Foreign Application Priority Data

Apr. 20, 1989 [DE] Fed. Rep. of Germany ....... 3912932

[51] Int. Cl.[5] .............................................. C22B 3/06
[52] U.S. Cl. ........................................ 75/712; 134/3; 423/658.5; 423/DIG. 20; 405/129
[58] Field of Search ................. 134/2, 3; 423/1, 658.5, 423/DIG. 20; 210/916; 405/129; 75/712

[56] References Cited

U.S. PATENT DOCUMENTS 4,508,641 4/1985 Hanulik .................................. 134/3
4,966,706 10/1990 Gregor ................................ 210/916

FOREIGN PATENT DOCUMENTS 0161698 11/1985 European Pat. Off. .
0278282 8/1988 European Pat. Off. .
0291746 11/1988 European Pat. Off. .
3707261 9/1988 Fed. Rep. of Germany .......... 423/1
2608628 6/1988 France .

OTHER PUBLICATIONS

Dr. Otto-Albrecht Neumiller, Rompps Chemie-Lexikon, 1973, p. 1051.

*Primary Examiner*—Melvyn J. Andrews
*Attorney, Agent, or Firm*—Nils H. Ljungman

[57] ABSTRACT

A method of cleaning debris, which involves the separation of heavy metals and oils, simultaneously, from the debris, which debris is primarily an inert substance, such as soil from a coking plant. The process employs acetic anhydride, which is mixed with the debris, for removing any moisture. After the addition of acetic anhydride, aqueous acetic acid is distilled off. The remaining distilland is then filtered to remove the heavy metals and oils from the debris.

8 Claims, 1 Drawing Sheet

METHOD OF CLEANING DEBRIS

BACKGROUND OF THE INVENTION

1. Field of the Invention

This invention relates to a method for cleaning debris and, more particularly, to a method which allows a desired substance to be obtained from the debris.

2. Background Information

It is, frequently, desirable to excavate debris, clean it and obtain desired substances during the cleaning process. As interest in the land grows, governmental agencies continuously issue more and more stringent standards concerning material, such as debris, which contain substances that may be harmful if not removed. As a result, industries which had, heretofore, only provided primary services to remove certain substances are now faced with the necessity of providing additional services to remove even more substances from debris. Additionally, certain industries are often faced with the burden of paying surcharges for inadequately removing substances from debris.

While some debris cleaning equipment provides adequate performance, some are expensive to install and operate. Further, some units take a long period of time to process the debris and result in a low volume/time yield of desired substances which are to be obtained. With the interest in protecting the land continuing to increase along with the interest in increasing the efficiency in land-related processes, certain specialists are constantly striving to obtain more efficient and less costly methods for the cleaning of debris. Such efficient techniques are especially important due to the increased use of substances which may affect the land.

Accordingly, this invention relates to a process for extracting heavy metals and organic chemicals from polluted substances and, more particularly, to such a process wherein the extracted heavy metals are, generally, water free.

Polluted soils, slurries and dusts, in addition to inert substances such as sand, humus, brickbat, gravel and wood, frequently contains heavy metals, heavy metal salts and/or heavy metal oxides.

It has been known to eliminate heavy metals from these soils, slurries or substances by treating them with aqueous, diluted inorganic or organic acids. In such a process, which may be performed by leaching, the percentage of water in the acid solutions employed is between 20% and 95%. The water portion, however, is an undesireable portion or solvent, which has to be removed in order to obtain the desirable water-free metal salts. When using, for example, an aqueous acetic acid or other organic acid, the water leads to the formation of muddy or slimy products or residues. The latter are formed by the oil present in the polluted soils or slurries.

Because of that, the separation of the metal salts, that are in the form of acetates, is more difficult. These metal salts contain an oil slurry impurity. Therefore, to enable further use of the metal salts, through recycling, an additional purification procedure is necessary to make them reusable.

OBJECT OF THE INVENTION

One object of the invention is to eliminate oils and heavy metals simultaneously, and in such a form, that they may be separated from each other without interfering with one another. This object is achieved by removing the water in the substance to be treated.

SUMMARY OF THE INVENTION

One aspect of the invention resides broadly in a method of cleaning debris including the steps of: providing the debris to be cleaned; providing mechanical support apparatus for supporting the debris; providing washing facility apparatus for cleaning the debris; positioning the washing facility apparatus adjacent the mechanical support apparatus; washing the debris with the washing facility apparatus and removing at least one desired substance from and debris.

Another aspect of the invention resides broadly in a process for separating at least a first substance and at least a second substance from at least a third substance including the steps of: mixing the third substance with a fourth substance to form a fifth substance; heating the fifth substance to remove from the fifth substance at least a sixth substance; and separating the at least first substance from the fifth substance, whereby the at least first substance and the at least second substance are separated from the at least third substance.

Yet another aspect of the invention resides broadly in a process for separating at least one heavy metal and at least one organic substance from at least one aqueous and inert substance including the steps of: mixing the substance with a first chemical to form a mixture; heating the mixture to distill from the mixture at least one second chemical; and separating the at least one heavy metal from the mixture, whereby the at least one heavy metal and the at least one organic substance are separated from the at least one aqueous and inert substance.

BRIEF DESCRIPTION OF THE DRAWING

The following Description of the Preferred Embodiment may be better understood when taken in conjunction with the appended drawing in which.

DESCRIPTION OF THE PREFERRED EMBODIMENT

Figure 1:
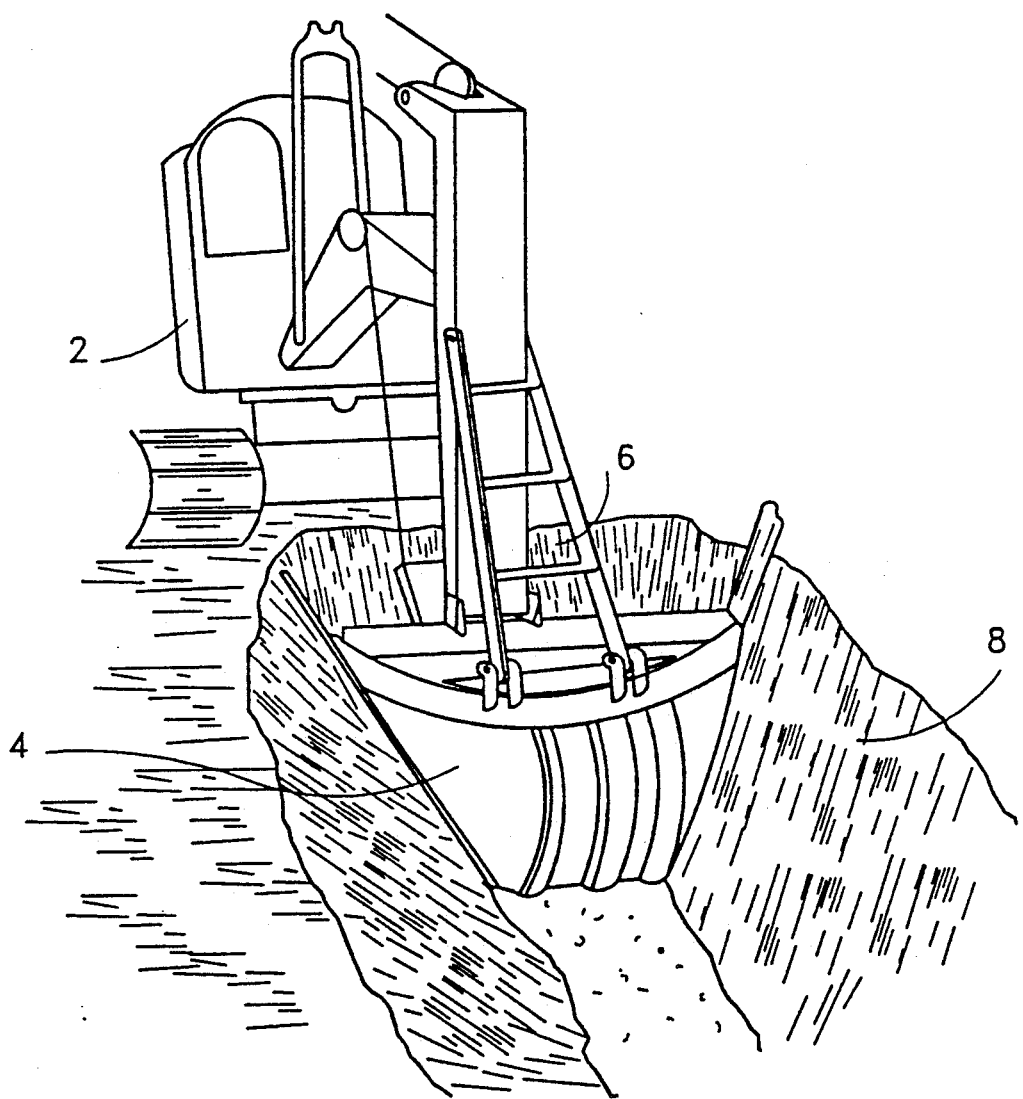
FIG. 1 shows a backhoe excavating the material to be processed by the present invention.

FIG. 1 shows backhoe 2 which includes bucket 4. Backhoe 2 and bucket 4 are employed to scoop out debris 6 from land area 8. Once this process is completed, debris 6 will then be processed in accordance with the present invention.

Removal of water is, of course, possible by the well-known techniques of squeezing out the water, such as, for example, by employing a filter press, or vaporizing the water. However, even those techniques do not remove minute amounts of water. For example, from 1% to 2%, of water may remain in the substance even after squeezing or vaporizing. These residual amounts of water have to be removed, otherwise, a complete removal of the oily, organic components from the soils or slurries is not accomplished.

In accordance with the invention, the, generally, complete removal of oil and heavy metals is accomplished because the water is completely extracted and, also, the process is performed in the non-aqueous phase.

It has been found that acet anhydride, in the non-aqueous phase, may advantageously be employed for the simultaneous removal of oils as well as of heavy metals. Acetic anhydride acts as an accepter of water and the remaining moisture for the substance to be treated, such as excavated soil from coking plant grounds. Also, acet anhydride aids in separating organic substances, such as oils and also heavy metals and salts thereof.

Since acetic anhydride has a boiling point of 139° C., it is possible to perform the process, of the present invention, at elevated temperatures so that acetic acid or acetic acid/water mixtures, developed from the anhydride water absorption, may evaporate at a maximum of up to 118° C. and no longer participate in the reaction.

In the context of this invention, heavy metals may include metals with a high specific gravity, such as a specific gravity of 5.0 and above. Examples of heavy metals may include Silver, Cesium, Cadmium, Mercury, Lead, Thorium, Indium, Manganese, Cobalt, Thallium, Actinium, Zirconium, Tin, Chromium and Arsenic.

The process of the present invention may include the following procedures. Initially, the substance to be processed, which may be polluted soils, slurries, dusts, sand, humus, brickbat, gravel, and/or wood, is placed in a suitable container. Next, acet anhydride is added to the substance. The mixture is heated to boil at a temperature range of about 120° C. to about 130° C. for about 20 minutes. A trap then extracts evaporated liquid and a condenser condenses the trapped substance. The trapped substance may include aqueous acetic acid. Then, the boiled mixture is allowed to cool to approximately 25° C. The mixture is, next, filtered to remove residual particles. Aqueous acid and water soluble organic solvents are added to the mixture and the mixture is either shaken or otherwise stirred or blended. Two vertically positioned phases then form; a milky aqueous phase and an oily phase. The milky aqueous phase is then extracted and the alkalinity of the extracted aqueous phase is adjusted. Heavy metals may then be drawn from the alkalinity adjusted milky aqueous phase. The oily phase is then allowed to solidify so that it may be burned.

EXAMPLE

The following example is presented in order to explain, in more detail, the process of the present invention. This example, however, does not restrict the breadth of the claimed invention thereto.

1000 g of coking plant soil, purified from gravel and brickbat, was placed in a 1 litre round-bottom flask. The soil had a moisture content of 10%. The solid was heavily soaked with oil and included small coke particles. 800 ml of acetic anhydride was added to the soil and the mixture was heated from about 120° C. to about 130° C., thereby causing it to boil.

About 90 ml of a transparent liquid was condensed in a trap provided behind a descending cooler. Upon examination, it was determined that the liquid comprised aqueous acetic acid.

After a boiling time of 20 minutes and a cooling down to 25° C., the contents of the flask was filtered. The filtrate was deep, dark brown An aqueous acid solution and a water-insoluble organic solvent, namely, trichloroethylene was added to a sample of the filtrate.

After shaking the mixture, two horizontally positioned layers were formed. The upper layer was milky and in the aqueous phase. The lower layer was dark brown and in an oily phase. Those two phases were, then, separated. After an alkaline adjustment of the aqueous phase was performed, a precipitation was obtained, that, upon examination, had a heavy metals content of 14%. The heavy metals were extracted from the treated substance. The oily phase yielded, after the solvent was boiled out, a dark oil that solidified at normal, ambient temperatures. That solid was combustible and was burned away without leaving any residue. The residue obtained in the filtration consisted of sand grains, wood and brick chips.

The amount of the acetic anhydride employed, in the process of the present invention, depends on the moisture content of the substance to be treated and on the amount of metals and of the organic substances. That can be determined on a case-by-case basis. It is evident, as described above, that, by initially drying the material, the moisture content, in the treated substances, is extensively reduced.

In summary, one feature of the present invention resides broadly in a process for separating heavy metals and organic substances from aqueous inert substances by mixing said inert substances with acet anhydride, distilling off the acetic acid or acetic acid/water mixture up to a distillation temperature of 118° C. and separating the remaining acet anhydride from said inert substances.

Some examples of heavy metals can be found in U.S. Pat. No. 4,873,065, entitled "Flue Gas Purification Process"; U.S. Pat. No. 4,824,650, entitled "Method for Extracting Arsenic and Heavy Metals from Phosphoric Acid"; U.S. Pat. No. 4,591,489, entitled "Process for the Treatment of Hydrochloric Acid Pickles Containing Iron and Zinc"; U.S. Pat. No. 4,503,016, entitled "Process for Extracting Heavy Metal Ions from Aqueous Solutions"; U.S. Pat. No. 4,420,380, entitled "Method for Extracting Heavy Metals from Sulphurated Mineral Concentrates"; U.S. Pat. No. 4,233,278, entitled "Process for Purifying Crude Phosphoric Acid"; U.S. Pat. No. 4,076,618, entitled "Treatment of Liquids Containing Complexed Heavy Metals and Complexing Agents"; U.S. Pat. No. 4,983,004, entitled "Preparation of a Diagnostic Agent for Measuring the Coagulability of Blood"; U.S. Pat. No. 3,965,238, entitled "Method of Recovering Uranium"; U.S. Pat. No. 3,901,802, entitled "Extraction of Heavy Metals from Wastes"; U.S. Pat. No. 4,888,053, entitled "Chloride Leaching of Iron-Based, Heavy Metal-Containing Sludges"; U.S. Pat. No. 4,574,075, entitled "Purification of Alkali Metal Nitrates"; U.S. Pat. No. 4,556,469, entitled "Electrolytic Reactor for Cleaning Wastewater"; U.S. Pat. No. 4,445,990, entitled "Electrolytic Reactor for Cleaning Wastewater"; U.S. Pat. No. 4,461,051, entitled "Restoration of High Infrared Sensitivity in Extrinsic Silicon Detectors" and U.S. Pat. No. 4,246,590, entitled "Restoration of High Infrared Sensitivity in Extrinsic Silicon Detectors."

All, or substantially all, of the components and methods of the various embodiments may be used with at least one embodiment or all of the embodiments, if any, described herein.

All of the patents, recited herein, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of a preferred embodiment is not to be taken as limited to all of the provided details thereof, since modifications and variations thereof may be made without departing from the spirit and scope of the invention.

What is claimed is:

1. A process for separating at least one heavy metal and separating at least one organic substance from at least one substance containing a combination of the at least one heavy metal, the at least one organic substance, water, and an inert portion, said process comprising the steps of:

mixing the at least one substance containing a combination with at least acetic anhydride to form a mixture containing at least acetic acid;

heating the mixture to distill from the mixture at least acetic acid; and separating the at least one heavy metal and the at least one organic substance from the mixture from which mixture the at least acetic acid has been distilled, whereby the at least one heavy metal and the at least one organic substance are separated from the at least one substance containing a combination.

2. The process of claim 1, further including the step of cooling said mixture to about 25° C. after said heating of said mixture and prior to separating the at least one heavy metal and the at least one organic substance from the mixture from which mixture at least the acetic acid has been distilled.

3. The process of claim 2, further including the step of filtering the mixture from which mixture at least the acetic acid has been distilled, to separate out a filtrate containing the at least one heavy metal and the at least one organic substance.

4. The process of claim 3, further including the step of adding at least one of: a) an aqueous acid solvent, and b) an organic solvent to the filtrate to form an aqueous phase and an oily phase.

5. The process of claim 4, further including the step of separating the aqueous phase from the oily phase.

6. The process of claim 5, further including the step of adjusting the alkalinity of the aqueous phase.

7. The process of claim 6, wherein the aqueous phase contains the at least one heavy metal.

8. The process of claim 7, wherein the organic solvent is trichloroethylene.

* * * * *